United States Patent [19]

Grujanac et al.

[11] Patent Number: 4,594,156

[45] Date of Patent: Jun. 10, 1986

[54] MOTORIZED SURFACE SCUM SKIMMER FOR WASTE WATER TREATMENT APPARATUS

[75] Inventors: Peter Grujanac, Bartlett; Clyde Huntington, Elgin, both of Ill.

[73] Assignee: Lakeside Equipment Corporation, Bartlett, Ill.

[21] Appl. No.: 752,073

[22] Filed: Jul. 5, 1985

[51] Int. Cl.⁴ .............................................. B01D 21/06
[52] U.S. Cl. .................................. 210/145; 210/528; 210/530
[58] Field of Search ............... 210/145, 148, 525, 528, 210/538, 530, 540, 523, 531

[56] References Cited

U.S. PATENT DOCUMENTS

| | | | |
|---|---|---|---|
| 3,327,867 | 6/1967 | Hikes | 210/528 X |
| 3,741,399 | 6/1973 | Peterson | 210/528 X |
| 3,864,257 | 2/1975 | Shaffer | 210/528 X |
| 3,872,017 | 3/1975 | Bishop | 210/525 |
| 4,069,150 | 1/1978 | Lodholz et al. | 210/528 X |
| 4,175,041 | 11/1979 | Drnevich et al. | 210/530 X |
| 4,367,141 | 1/1983 | Dorombozi et al. | 210/145 |
| 4,462,909 | 7/1984 | Kennel | 210/538 X |

*Primary Examiner*—Thomas Wyse
*Attorney, Agent, or Firm*—Wood, Dalton, Phillips, Mason & Rowe

[57] ABSTRACT

Waste water treatment apparatus including a vessel for receiving the waste water and having an inlet and an effluent outlet spaced from the inlet. The space between the two defines a flow path for the waste water and a scum outlet is also provided for the vessel. An elongated trough having an elongated opening is disposed horizontally in the vessel at an intended level of waste water therein and extends across the flow path. A movable skimmer blade extending below the intended level of waste water can be drawn along the flow path to capture scum and deliver and deposit the same in the trough through the opening thereof.

8 Claims, 11 Drawing Figures

MOTORIZED SURFACE SCUM SKIMMER FOR WASTE WATER TREATMENT APPARATUS

FIELD OF THE INVENTION

This invention relates to a surface scum skimmer for use in waste water treatment apparatus for removing floating scum on the surface of the waste water during the treatment thereof.

BACKGROUND OF THE INVENTION

Prior art of possible relevance includes the following U.S. Pat. Nos.: 2,497,177 issued Feb. 14, 1950 to McClintock et al; 2,780,361 issued Feb. 5, 1957 to Evans; 3,688,909 issued Sept. 5, 1972 to Titus et al; and 4,166,036 issued Aug. 28, 1979 to Barnhouser.

In U.S. Pat. No. 2,418,950 there is described a clarifier for waste water that has met with substantial success and has been recognized as one of the most efficient clarifiers or settling tanks devised. In practice, such a clarifier is constructed with a generally circular vessel which receives the waste water to be treated. Just inwardly of the side wall is a peripheral skirt which extends about the side wall from a waste water treatment inlet almost a full 360° to a scum outlet. Typically, the spacing between the skirt and the side wall progressively narrows as one moves from the inlet to the scum outlet.

The lower end of the skirt is located above the bottom wall of the vessel.

The progressive narrowing of the space between the skirt and the vessel wall causes influent to be forced under the bottom of the skirt and rise into the center of the vessel. Solids within the influent settle in the process and accumulate on the bottom of the vessel.

Centrally of the vessel is a weir structure which serves as an effluent collecting trough. Clarified waste water at the water level in the vessel flows across the weir structure to be collected and discharged as clarified effluent. The flow of water in the vessel is circular with constant radially inward movement toward the collecting trough.

Though this clarifier works well for its intended purpose, occasionally difficulties may be encountered where the water to be treated contains considerable scum which accumulates on the surface inwardly of the skirt. In such a case, such scum may flow across the weir at the effluent collector to be discharged with the effluent. Since the effluent is intended to be clarified when discharged, the presence of such scum may result in a perception of a less than fully efficient clarifying operation.

Scum skimming apparatus has been employed in other waste water treatment apparatus as well. In many cases, the skimming apparatus is cumbersome and/or expensive to fabricate.

The present invention is directed to overcoming one or more of the above problems.

SUMMARY OF THE INVENTION

It is the principal object of the invention to provide a new and improved scum skimming apparatus for use in waste water treatment. More specifically, it is an object of the invention to provide a scum skimming apparatus which is simple in its construction and which lends itself to use in waste water treatment apparatus of varying sorts, particularly clarifiers of the type mentioned previously.

An exemplary embodiment of the invention achieves the foregoing objects in a waste water treatment apparatus including a vessel for receiving waste water. The vessel is provided with a waste water inlet as well as an effluent outlet which is spaced from the inlet. A scum outlet is also provided for the vessel. The vessel defines a flow path between the waste water inlet and the effluent outlet and an elongated scum trough having an elongated upper opening is disposed horizontally in the vessel at the intended level of waste water and located across the flow path. An elongated skimmer blade is disposed in the vessel. Means are provided to mount the trough and the blade for relative movement along the flow path such that scum on the surface of such waste water accumulated on the blade will be deposited in the trough when the relative movement brings the blade and trough together. Means are provided for removing scum thus captured from the trough.

In a highly preferred embodiment, the trough is stationarily positioned with respect to the flow path and the blade is movable along the flow path.

Preferably, the mounting means comprises a support mounted above the intended level of waste water in the vessel which is mounted for movement along the flow path. Hinge means are provided above the trough for mounting the blade to the support in depending relation thereto. Thus, the blade can be pivoted upwardly on the hinge means upon contact with the trough to allow the blade to pass over the trough during relative movement between the same while dragging scum accumulated on the blade into the opening of the trough.

A motor is provided and is connected to the support for moving the support along the flow path.

In a preferred embodiment, the waste water treatment apparatus comprises a clarifier having a generally circular side wall with a peripheral skirt within the vessel in proximity to the side wall. Means are provided for introducing the waste water to be clarified into the area between the skirt and the side wall and the vessel includes a generally centrally located effluent collecting trough. A baffle surrounds the collecting trough and the scum trough extends at least between the skirt and the baffle. An elongated skimmer blade extends between the skirt and the baffle and has a portion disposed below the intended level of waste water in the vessel. Means mount the skimmer blade for movement around the vessel between the skirt and the baffle and means are provided for driving the skimmer blade through such movement. Means are also provided for removing scum from the scum trough.

In a preferred embodiment, the distance between the skirt and baffle varies at different locations angularly about the vessel. The blade has a length sufficient to essentially span the greatest distance between the skirt and the baffle and at least one end of the blade is sufficiently flexible so as to bend upon contact with one or the other or both of the skirt and the baffle. This preferred embodiment also contemplates that the blade be mounted for pivotal movement about a generally horizontal axis above the trough, or at least be such that the lower portion of the blade can move upwardly to pass over the scum trough. Preferably springs are employed to bias portions of the blade to preferred position.

An elongated support may be provided for the blade as mentioned previously. One end of the support mounts a roller engaged with a circular track extending about the vessel while the other end of the support is secured to a ring. Roller means are provided on the vessel for engaging the ring and the driving means are connected to the ring for rotating the ring.

In a highly preferred embodiment, the circular track is located radially outwardly of and concentric with the ring.

The invention also contemplates that at least one edge of the opening in the trough be provided with an external ramp extending below the intended level of waste water in the vessel. Thus, the skimmer blade may operate to drag accumulated scum up the ramp to positively assure entry of the scum into the trough.

Other objects and advantages will become apparent from the following specification taken in connection with the accompanying drawings.

DESCRIPTION OF THE PREFERRED EMBODIMENT

Figure 1:
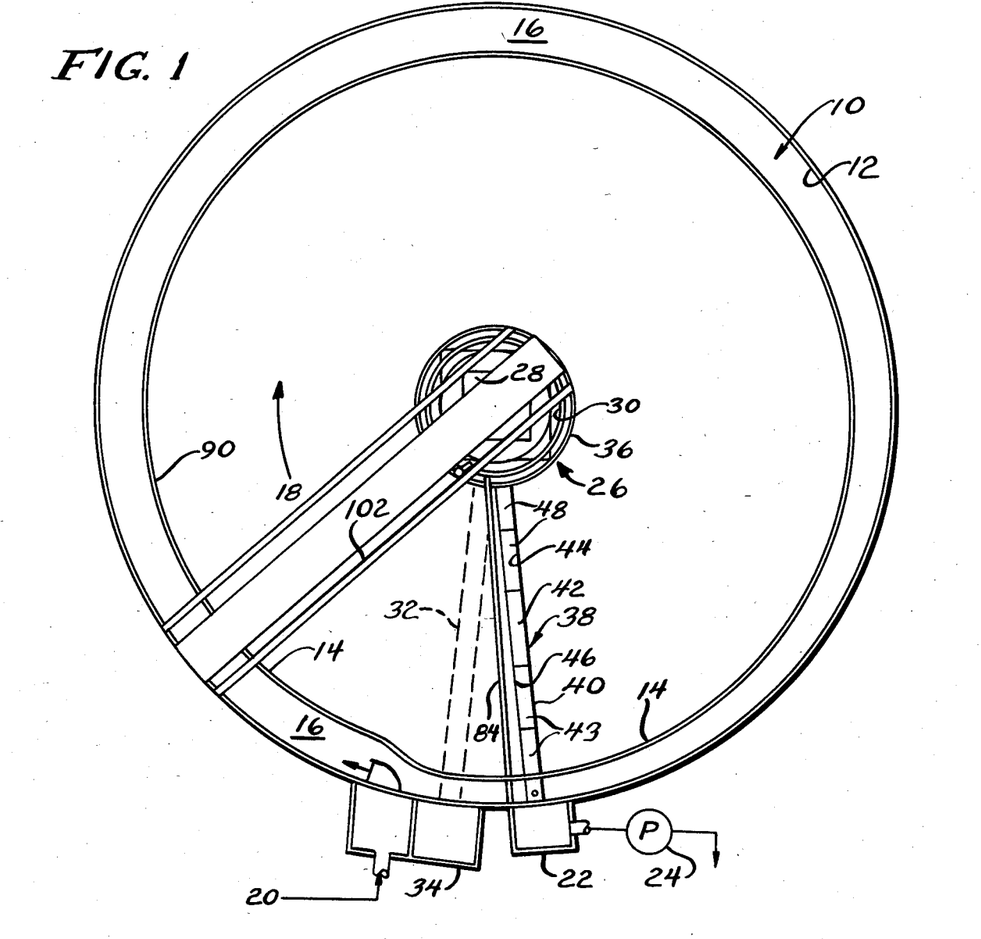
FIG. 1 is a somewhat schematic, plan view of a waste water treatment apparatus embodying the invention, and more specifically, a clarifier.

An exemplary embodiment of the invention is illustrated in FIG. 1 in its preferred environment of a clarifier type of waste water treatment apparatus. However, it is to be understood that the principles of the invention may be used with efficacy in other sorts of waste water treatment apparatus and the invention is not to be limited to clarifiers except as set forth in the appended claims.

The waste water treatment apparatus comprises a vessel, generally designated 10, having a circular side wall 12. Disposed within the vessel 10 in proximity to the side wall and extending peripherally thereabout is a skirt 14. The skirt extends above the intended level of waste water within the vessel 10 and well below such intended level toward, but not to, the bottom of the vessel 10. Typically, the space 16 between the skirt 14 and the side wall 12 progressively narrows in the direction of fluid flow within the vessel shown by arrows 18. In the usual case, a driven, rotatable sludge scraper of conventional construction (not shown) is provided and is movable about the vessel 10 below the skirt 14 to direct accumulated sludge to a suitable outlet.

An inlet to the area 16 is shown schematically at 20 whereat waste water to be clarified is introduced into the space 16.

Almost 360° about the vessel 10, whereat the skirt 14 is in its closest proximity to the side wall 12, there is provided a scum pit 22 which acts as a scum outlet. A pump 24 of sufficient capacity to selectively drive the level of material within the scum pit 22 below the level of waste water within the vessel 10 is provided. The scum pit 22 is, of course, in fluid communication with the interior of the vessel 10 as will be seen.

In the center of the vessel is an effluent collecting trough, generally designated 26, including conventional inner and outer weirs 28 and 30. Clarified water received by the effluent trough 26 is passed via an effluent pipe 32 disposed below the intended level WL (FIG. 2) of waste water in the vessel to an effluent outlet 34 at the side wall 12.

Figure 2:
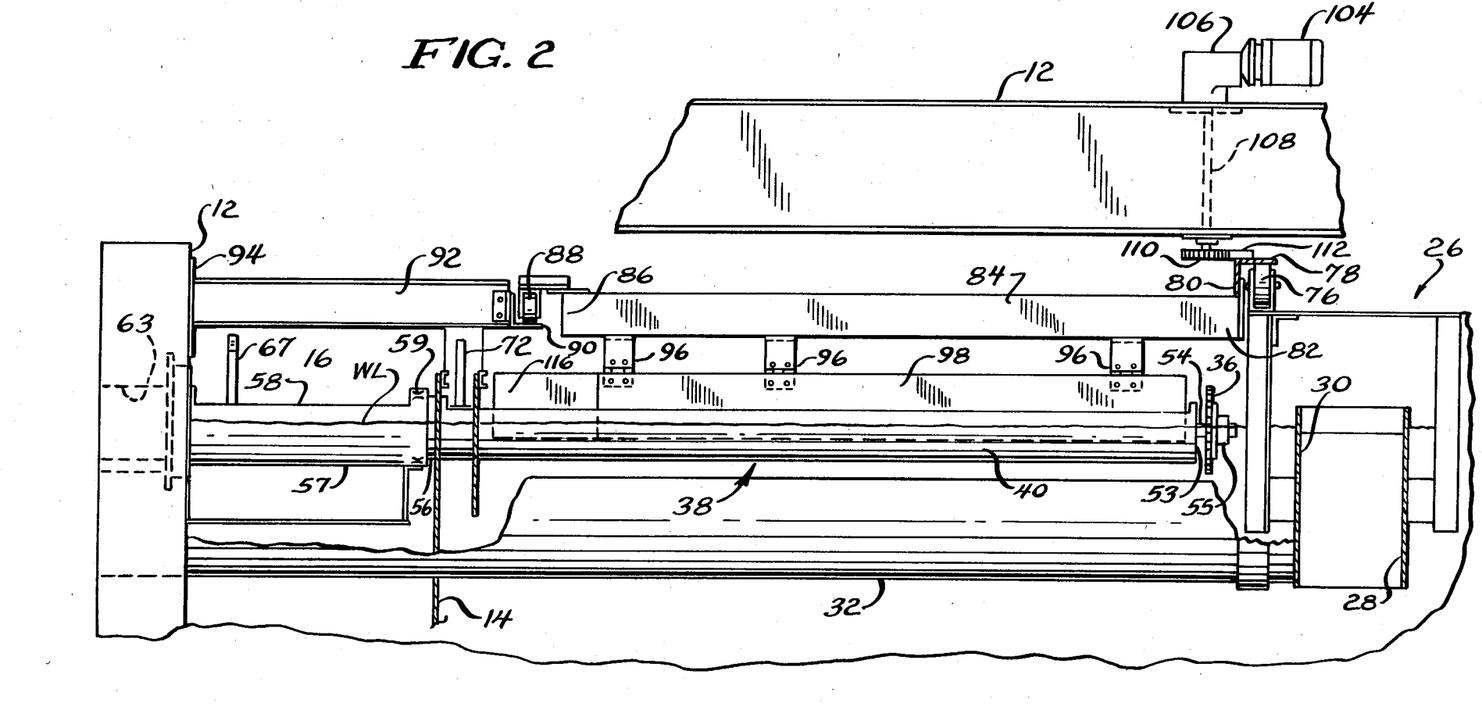
FIG. 2 is a side elevation of a surface scum skimmer made according to the invention.

In normal operation, waste, scum and other floatables introduced into the vessel 10 at the inlet 20 will generally remain on the surface of the waste water and thus will be confined between the side wall 12 and the skirt 14 to ultimately be deposited in the scum pit 22. However, it occasionally occurs that scum will pass below the lower edge of the skirt 14 radially inwardly toward the effluent trough 26 before surfacing. To prevent such scum from entering the effluent trough 26, the latter is surrounded by a baffle 36 which extends above and somewhat below the intended level of waste water within the vessel 10 as best seen in FIG. 2. There is also provided a surface scum skimmer, generally designated 38, for removing all scum that surfaces radially inwardly of the skirt 14. As can be seen in FIGS. 1 and 2, the scum skimmer 38 extends across the flow path 18 of waste water within the vessel between the baffle 36 and the skirt 14. In a highly preferred embodiment, the scum skimmer 38 extends through the skirt 14 into the space 16 between the side wall 12 and the skirt 14 to capture scum accumulating therein and deliver the same to the scum pit 22 which is in fluid communication with the scum skimmer 38.

Figure 3:
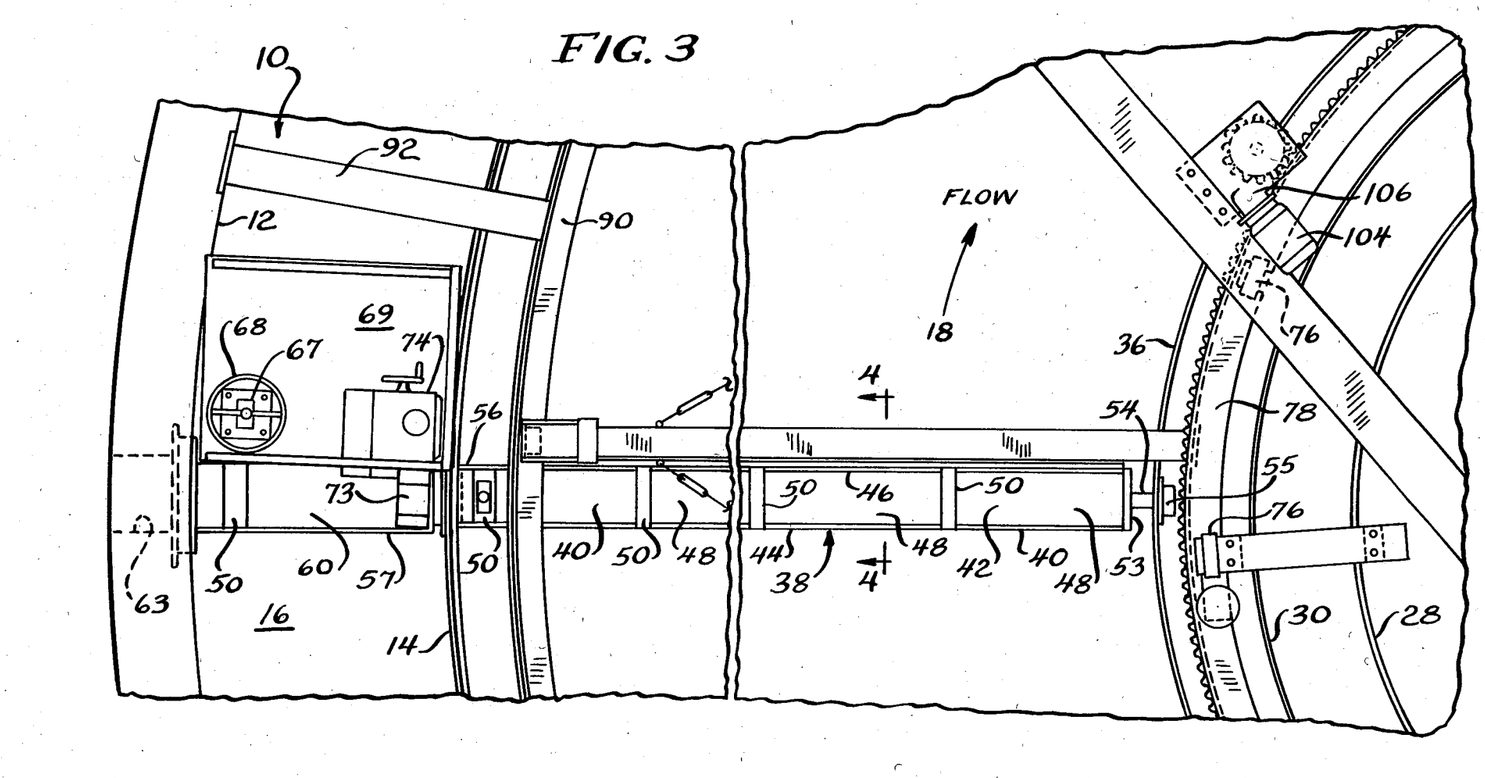
FIG. 3 is a plan view of the surface scum skimmer.
Figure 4:
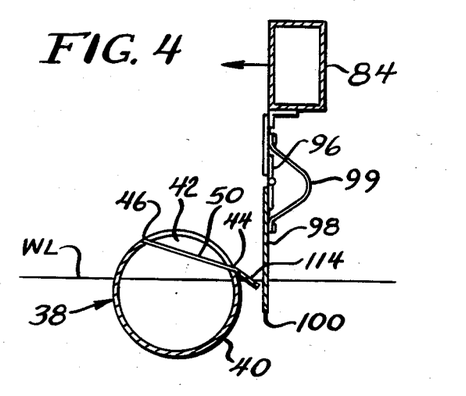
FIG. 4 illustrates the scum skimmer in a skimming position.
Figure 5:
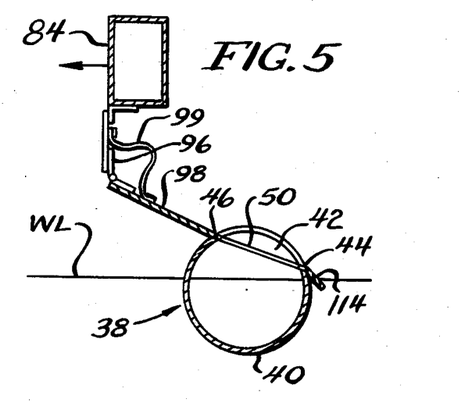
FIG. 5 is a view similar to FIG. 4 but showing the surface scum skimmer in a subsequent stage of a skimming operation.

The scum skimmer 38 comprises an elongated, horizontal scum trough 40 having an upper opening 42 defined by spaced edges 44 and 46. In a preferred embodiment, the trough 40 is formed of a pipe having a generally circular cross section. The use of a pipe allows economical construction. The opening 42 is defined by a series of elongated slots 48 in a side wall of the pipe which are aligned with each other and separated by braces 50 extending between the edges 44 and 46 to rigidify the structure and thereby provide a measure of structural integrity. As seen in FIGS. 3–5, the braces may comprise flat plates 52 suitably secured to the edges at the desired intervals. The braces are short in the direction of elongation of the trough 40 so as not to occlude the opening 42 and are substantially coplanar with the opening 42.

Figure 6:
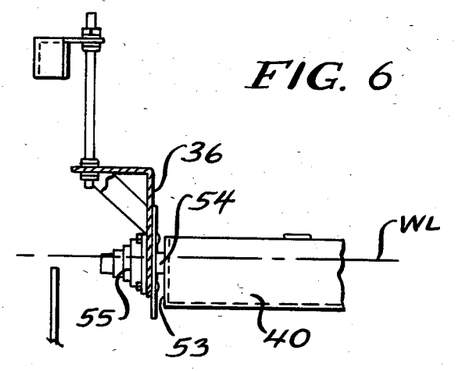
FIG. 6 is a fragmentary elevational view showing the mounting of one end of a scum trough.

As seen in FIGS. 2, 3 and 6, the radially inner end of the scum trough 40 is closed by a plate-like disk 53 to which a stub shaft 54 is mounted. The stub shaft 54 is journalled in a bearing 55 which in turn is mounted on the baffle 36.

Figure 7:
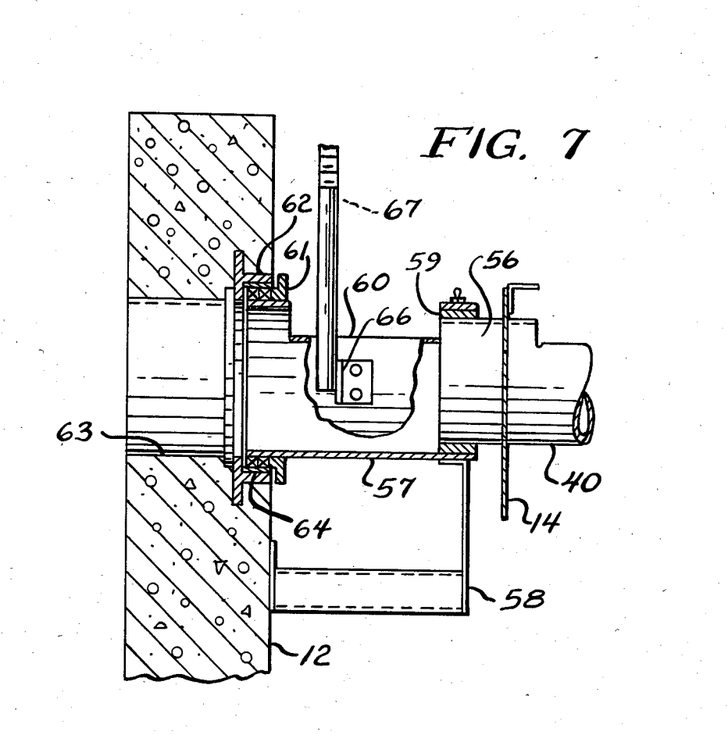
FIG. 7 is a fragmentary elevational view showing the mounting of the other end of the trough.

The radially outer end 56 of the scum trough 40 extends through a suitably sized opening in the skirt 14 into a scum pipe 57 of larger diameter which, as best seen in FIG. 7, rests on a brace 58 secured to the side wall 12. A bearing 59 is interposed between the scum pipe 57 and the scum trough 40 to journal the end 56 of the scum trough 40. Thus, the scum trough 40 is supported only at its ends and is journalled for rotation about its elongated axis by the bearings 55 and 59.

The scum pipe 57 is provided with an upper opening 60 similar to the slots 48 which serve essentially the same purpose as will be seen. The end of the scum pipe 57 opposite the scum trough 40 is received in a collar 61 which in turn is disposed within a sleeve 62 cast into the wall 12 about an opening 63 extending to the scum pit 22. Interposed between the collar 61 and the sleeve 62 are rings 64 of bearing and gasket material. Consequently, the scum pipe 57 is journalled for rotation about the same axis as the scum trough 40. As seen in FIG. 7, a lever 66 is mounted on, and extends to one side of the scum pipe 57. An upstanding jack screw 67 is pivoted by any suitable means to the lever and extends to a hand wheel 68 (FIG. 3) located above an operator platform 69 adjacent the side wall 12. By rotating the hand wheel 68, the jack screw 67 is raised or lowered to pivot the scum pipe 57 about its rotational axis. Such rotation is allowed because the scum pipe 57 merely rests on the support brace 58, the latter acting as a cradle for the end of the scum pipe 57 receiving the scum trough 40.

It will be noted that the end 56 of the scum trough 40 is open ended and thus is in fluid communication with the interior of the scum pipe 57. The latter is in fluid communication with the scum pit 22 via the opening 63. The bearings 59 and 64 act at least as gross seals at the interface of the trough 40 and pipe 57, and the pipe 57 and the opening 63, respectively. If desired, the material forming such bearings may be chosen to act as a frictional drag against rotation of the trough 40 and/or the pipe 57.

Figure 8:
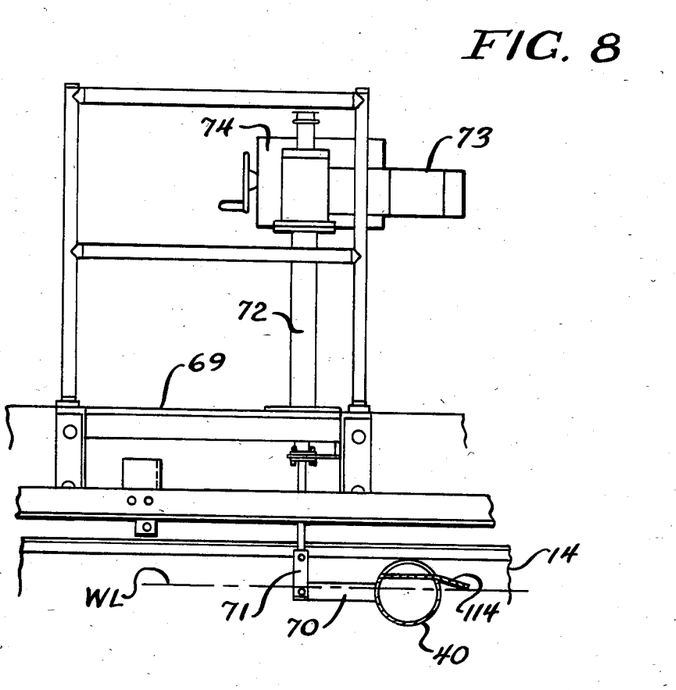
FIG. 8 is an elevational view of an operator for the trough.

As best seen in FIG. 8, and to a lesser degree seen in FIGS. 2 and 3, the scum trough 40, immediately adjacent the skirt 14, mounts a lever 70 similar to the lever 66. The lever 70 is pivoted via a link 71 to an upstanding jack screw unit 72 located on the platform 69. In lieu of the hand wheel 68 used to operate the jack screw 67, the unit 72 can be operated by a bidirectional motor 73 through a variable speed drive 74. Thus, the angular disposition of the scum trough 40 can be changed at will by suitably energizing the motor 73.

The bearings 55, 59 and 64 are so oriented as to mount the trough 40 and pipe 57 for rotation about a horizontal axis which is nominally at an intended level of waste water WL within the vessel 10. Rotation of the trough 40 can then be employed to dispose the edge 44 of the opening 42 at or slightly below the existing level of waste water within the vessel as, for example, to a position such as shown in FIG. 4. Similarly, the scum pipe 57 may be rotated similarly with respect to the intended level of waste water WL within the vessel 10 to cover the area within the space, more commonly called race, 16 between the skirt 14 and the wall 12.

As a consequence, scum on the surface between the skirt 13 and the baffle 36 will be captured by the scum trough 40 and enter the same through the opening 42. Because the trough 40 is in fluid communication with the scum pit 22, and the pump 24 is of sufficient capacity as to maintain the level of material therein somewhat below the level of waste water within the vessel 10, scum and a small amount of waste water entering the trough 40 over an edge 44 or 46 will flow along the length of the trough 40 and will be received in the scum pit 22.

According to the invention, means are provided for positively advancing surface scum to the trough. As seen in FIGS. 1–3, the effluent collector 26 mounts a plurality of upstanding rollers 76 which have their axes in a generally horizontal plane and on a radius of the vessel 10 and are further located at equal radial spacings from the center of the vessel 10. An angle ring 78 is superimposed on the rollers 76 to be journalled thereby. The ring 78 includes a depending, peripheral flange 80 on its radially outer extremity to which is secured one end 82 of an elongated tube or box beam 84. The box beam 84 extends across the flow path within the vessel and at its opposite end 86, mounts a roller 88 which rotates about a horizontal axis disposed on the radius of the vessel 10. The roller 88 is engaged with a circular track 90 which is located above the skirt 14 and extends about the periphery of the vessel 10. The track 90 is disposed somewhat inwardly of the outer wall 12 of the vessel 10 by a series of cantilevered support brackets 92 (only one of which is shown) mounted by mounting plates 94 to the wall 12 and is concentric with the ring 78.

As seen in FIGS. 2, 4 and 5, at various locations along its length, the box beam 84, on its underside, mounts depending hinges. The hinges 96 are located above the top of the trough or pipe 40 and mount an elongated skimmer blade 98.

The hinges 96 are configured such that the skimmer blade 98 may pivot about a generally horizontal axis which in turn is located above the top of the trough 40. U-shaped springs 99 may be disposed at each of the hinges 96 and serve to bias the blade 98 to the position illustrated in FIG. 4. Thus, the lower edge 100 of the skimmer blade 98 will be disposed below the intended level of waste water WL in the vessel when the blade 98 is not encountering the scum trough 40.

As is conventional in clarifiers of this type, the same is provided with a bridge shown schematically at 102 which extends from the outer wall 12 to the effluent collector 26. An electric motor 104 is mounted on the bridge and drives, via a 90° gear reduction system 106, a vertically oriented shaft 108. The shaft 108 is suitably journalled to the bridge by appropriate bearings and extends downwardly to terminate in adjacency to the flange 80 on the ring 78. At this location, the shaft 108 mounts a spur gear or sprocket 110. A rack 112 is attached to the upper leg of the angle ring 78 and secured thereto by any suitable means. The rack 112 is in engagement with the sprocket 110 and as a consequence of this configuration, when the motor 104 is energized, the ring 78 will be rotated thereby carrying the box beam 84 and the skimmer blade 98 with it.

As the skimmer blade travels about the vessel between the skirt 14 and the baffle 36, it will catch or capture floating scum or other materials on the surface of the waste water in the vessel and drag such material with it. When it encounters, during such movement, the pipe or trough 40, it will push the accumulated scum up over the edge 44 to deposit the same within the trough 40 from which it is conveyed to the scum box 22 as mentioned previously.

To assist in such depositing of scum in the trough 40, the latter is provided with an elongated ramp such as a plate 114 or the like which is on the external side of the edge 44 and which is intended to be located below the intended level of waste water WL in the vessel. Thus, the ramp acts as an inclined plane to assist the deposit of scum carried by the blade 98 in the trough 40.

The presence of the hinges 96 allows the skimmer blade 98 to deflect upwardly and pass over the trough 40 during and following the depositing operation.

Figure 9:
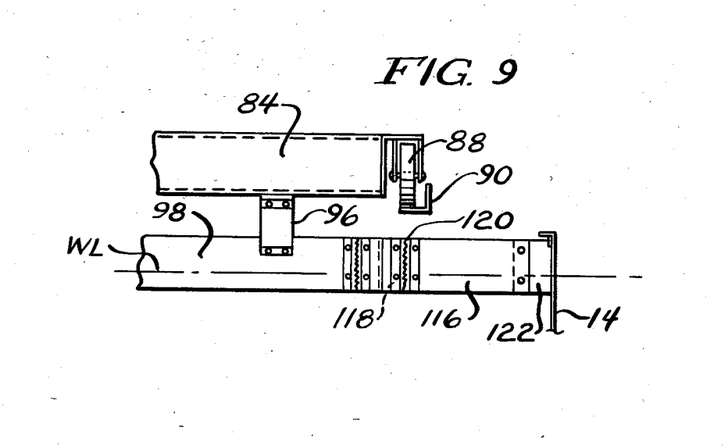
FIG. 9 illustrates one end of a skimmer blade.
Figure 10:
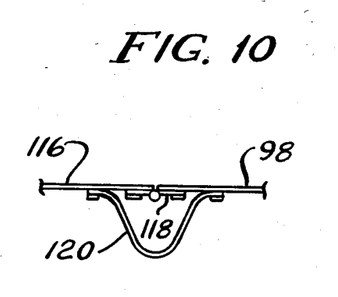
FIG. 10 is an enlarged, fragmentary plan view of part of the end of the skimmer blade.

It will be recalled that the distance between the skirt 14 and the baffle 36 progressively increases in the direction of the flow path beginning at the inlet 20 and extending to the scum box 22 whereat such distance is the greatest. It is preferable that the blade 98 be configured to span essentially the entire distance between the baffle 36 and the skirt 14 at the scum box 22 to avoid the presence of dead spots that are not skimmed by the blade 98 as it travels about the vessel 10. In order to avoid damaging interference between the skimmer blade 98 and the skirt 14 when the latter is at a relatively radially inward location, the radially outer end of the skimmer blade 98 mounts a plate 116 (FIGS. 2 and 9) by means of a hinge 118 (FIGS. 9 and 10) having a vertical pivot axis. A U-shaped spring 120 is secured to both the blade 98 and plate 116 on their downsteam sides (in the direction of skimmer travel) and serves to resiliently bias the plate 116 to the position shown in FIG. 10 wherein it acts as a deflectable extension of the blade 98. The resilience provides for restoration of the end 116 to the plane of the remainder of the skimmer blade 98 when such contact is lost.

To allow such deflection, all of the hinges 96 will be secured to the skimmer blade 98 at locations radially inwardly of the plate 116.

To prevent metal to metal scraping contact between the skirt 14 and the plate 116, the radially outer end of the latter mounts a radially outwardly directed rub plate and seal 122 made of rubber or the like which engages the skirt 14 at all times and effects at least a gross seal thereagainst.

Figure 11:
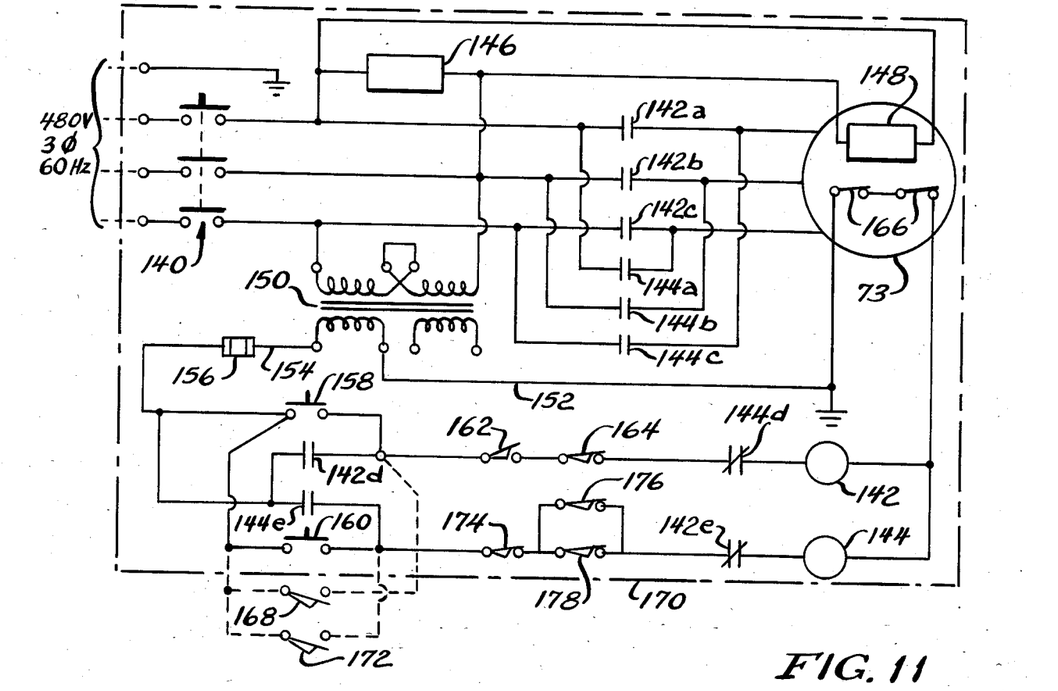
FIG. 11 is an electrical schematic of a control circuit for the scum skimmer.

FIG. 11 represents, in schematic form, a control system for the skimmer components of the clarifier. Addressing first the pivoting of the scum trough 40, the bi-directional motor 73 therefore is operative to pivot the trough to the position illustrated in FIG. 4 for one directional output, sometimes referred to as opening the trough, and to pivot the trough 40 from the position in FIG. 4 to one wherein both the edges 44 and 46 are above the intended level of waste water WL in the vessel, sometimes referred to as closing the trough. In a preferred embodiment, the motor 73 is a three phase motor and is connected to power via a circuit breaker, generally designated 140, and normally open contacts 142A, 142B and 142C of a relay 142 or normally open contact 144A, 144B and 144C of a relay 144. The arrangement is such that when the contacts 142A, B and C are closed, the motor 73 will be energized to drive the scum trough 40 to its closed position. Conversely, when the contacts 144A, B and C are closed, the output of the motor 73 will be reversed and will drive the scum trough 40 towards its open position.

Since the components will normally be contained in a control panel or the like, space heaters 146 and 148 are provided for the purpose of maintaining a sufficiently high temperature level as to prevent condensation of water vapor in the environment within the control panel that could lead to corrosion.

A transformer 150 is connected in the circuit as illustrated and provides a lower voltage utilized by various control components. One side 152 of the transformer secondary is connected to ground while the other side 154 is connected through a fuse 156 to normally open, manually operable switches 158 and 160. As will be seen, to manually cause the scum trough 40 to move to a closed position, the switch 158 may be depressed. To cause opening movement, the switch 160 may be depressed.

Connected in parallel with the switch 158 are normally open contacts 142D operated by the relay 142. The parallel combination of the switch 158 and contacts 142D is connected through the serial combination of a normally open limit switch 162, a conventional normally closed torque responsive switch 164, normally closed contacts 144D operated by the relay 144, the relay 142, and thermally responsive switches 166 within the motor 73 itself.

A further normally open limit switch 168, external of the circuit cabinet shown schematically at 170, is also connected in parallel with the contacts 142D and the switch 158. The limit switch 168 is disposed within the vessel 10 at such a location as to be closed momentarily by the skimmer blade structure, such as the box beam 84, as the same is moved clear of the scum trough 40, that is, moved just past the position illustrated in FIG. 5 in relation to the scum trough 40. The limit switch 162 is so located with respect to the drive train operated by the motor 73 as to be opened when the scum trough 40 is in its fully closed position and closed at all other times.

The switch 164 will be closed during normal operation of the system. However, the same is adapted to open in the event excess torque in the drive train operated by the motor 73 is sensed which would be indicative of a malfunction in the system.

Connected in parallel with the switch 160 are normally open contacts 144E operated by the relay 144. Also connected in parallel with the switch 160 is a normally open limit switch 172. The limit switch 172 is disposed within the vessel 10 in such a way as to be closed by the skimmer structure in the same fashion as the switch 168 is closed but at a time just prior to engagement of the blade 98 with the ramp 114, that is, just prior to the time the components assume the relationship illustrated in FIG. 4.

The parallel combination of the contacts 144E, the switch 160 and switch 172 is connected in series with a limit switch 174, two limits switches 176 and 178 in parallel with each other, normally closed contacts 142E operated by the relay 142, the relay 144 and the switches 166 to ground.

The switch 174 is associated with the drive train operated by the motor 73 so as to be closed whenever the scum trough 40 is not in its fully open position. For the latter occurrence, the switch 174 will be open.

The switch 178 is a torque sensing switch and serves the same function as the switch 164. The switch 176 is located in the drive train operated by the motor 73 so as to be closed whenever the switch 162 is open and vice versa.

The scum trough 40 may be moved to a closed position through manual operation simply by momentarily depressing the switch 158. Since, at this time, the switch 162 will be in a closed position, the relay 142 will be energized thereby closing the contacts 142A–C to energize the motor 73. Simultaneously, the contacts 142D in parallel with the switch 158 will close to lock in the relay 142 even after the switch 158 reverts to an open position. The motor 73 will drive the scum trough 40 to the closed position and when such is attained, the switch 162 will be opened thereby de-energizing the relay 142 and disconnecting the motor 73 from power as a consequence of the resulting opening of the contacts 142A–C.

Manual operation to cause the scum trough 40 to move to the open position is accomplished in the same fashion simply by momentarily depressing the switch 160.

In both cases, it will be appreciated that in order for the relay 142 to be operated, the relay 144 must not be energized as such would open the contact 144D preventing energization of the relay 142. Similarly, the relay 144 cannot be energized when the relay 142 is energized since the contacts 142E would open.

For automatic operation, movement of the skimmer assembly to a point immediately forward of the scum trough 40 will cause the switch 172 to be momentarily closed. This will result in energization of the relay 144 in the same fashion generally mentioned above since the switch 172 is in parallel with the switch 160. After the skimmer blade assembly has moved past the scum trough 40, the switch 168 will be momentarily closed resulting in energization of the relay 142 to cause the motor 73 to drive the scum trough 40 to the closed position.

In this fashion, the scum trough 40 will be disposed in the open position only when such is required as the skimmer blade assembly approaches the same. Thus, continual flow to the scum pit 22 from the trough 40 is avoided except when the trough 40 is actually receiving scum off the blade 98.

Control of the skimmer blade assembly is accomplished by operation of the motor 104 which is connected to three phase power via a circuit breaker, generally designated 180, in series with normally open contacts 182A, 182B, and 182C operated by a relay 182.

A transformer 184 is connected to the power source as indicated and its secondary 186 provides a low voltage power source for a control circuit for the relay 182. The secondary 186 also provides power through a fuse 188 and a thermal control switch 190 for a strip heater 192 serving the same general function as the space heaters 146 and 148.

Via a second fuse 194, power is supplied to a selector switch, generally designated 196 and to a conventional reset timer 198 of the type whose timing period can be varied as, for example, from one hour to thirty hours.

The switch 196 has a blade 197 which, when in the position shown, disables the control circuit for the motor 104 entirely. When pivoted in a clockwise direction to connect contacts 196A and 196C, the system is placed in condition for an automatic mode of operation. Conversely, when the blade 197 is rotated in a counterclockwise direction to interconnect contacts 196B and 196D, the relay 182 will be immediately energized provided overload sensing contacts 200 are closed to initiate a continuous skimming operation.

To manually initiate operation of the blade drive, normally open hand operated switch 202 is connected between the contact 196C and the relay 182 and as will be seen, when closed, will cause energization of the relay 182 to initiate one cycle of operation of the skimming blade assembly, that is, one revolution of the same about the vessel 10. Connected in parallel with the switch 202 is a limit switch 204. When the skimming blade assembly is in some predetermined or "home" position with respect to the vessel 10, it will cause the switch 204 to be opened. As soon as the assembly moves from the home position, the switch 204 will close and will remain closed until the assembly has traveled once about the vessel and returned to the home position, at which time it will be reopened.

Thus, upon the closing of the switch 202, the resulting energization of the relay 182 will cause the motor 104 to begin to rotate the skimmer assembly allowing the limit switch 204 to close. Release of the switch 202 will not result in the de-energization of the relay 182 since it remains energized via the now closed switch 204 and will remain so energized until the switch 204 is opened after the skimmer assembly is cycled once.

In parallel with the switches 202 and 204 are normally open timer contacts 198A for automatically initiating blade operation. When the timer 198 times out, it will, for a short period of time, close the contacts 198A to cause energization of the relay 182 and thus the motor 104. Again, as the skimmer assembly moves out of its home position, the switch 204 will close to maintain the relay 182 energized even though the contacts 198A will subsequently open during the cycle as a result of operation of the timer 198. Again, a full cycle of the skimming apparatus will occur.

A further switch 206 is ganged with the switch 204 and is connected to the timer 198 on a reset line 208. Each time the switch 204, and thus the switch 206 is permitted to close as a result of the skimmer assembly moving away from its home position, the switch 206 applies a reset signal to the timer 198 to initiate a new timing cycle. Thus, the apparatus is always conditioned to automatically initiate a cycle at a predetermined time period after the last cycle, regardless of whether the same was manually or automatically initiated.

In some instances, where motorized control of the scum trough 40 is not warranted, the motor 73 and associated control circuitry may be omitted in favor of a jack screw or some other similar manually operated drive capable of pivoting the scum trough 40. Similarly the sophisticated controls for the blade driving motor 104 can, in some cases, be dispensed with in favor of a simple off-on switch.

From the foregoing, it will be appreciated that a scum skimmer made according to the invention provides ideal skimming capability. The same is extremely simple in construction and its skimming configuration may be readily altered to accommodate variations in waste water level within the vessel 10. Movement of the scum trough 40 between open and closed positions is automatic and the maintenance of the scum trough 40 in a closed position except when the skimming blade 98 approaches the same minimizes the amount of waste water that must be discharged from the system to achieve scum removal and yet does not affect the operation of the scum pipe 52 between the skirt 14 and the vessel wall 12 so that the latter will remain operative to pick up and remove the scum customarily found in the race 16.

We claim:

1. A clarifier for waste water comprising:
a vessel having a generally circular side wall;
a peripheral skirt within said vessel and spaced from but within proximity to said side wall;
means for introducing waste water into said vessel between said skirt and said side wall;
means generally centrally of said vessel defining an effluent collector;
an upstanding baffle surrounding said effluent collector and adapted to project above and below the intended level of waste water in said vessel to prevent floatables between said skirt and said baffle from moving to said effluent collector;
an elongated scum trough having a lengthwise opening in one side extending between, and journalled and supported solely by said skirt and said baffle so as to be rotatable about a generally horizontal axis approximately at the intended level of waste water in said vessel;

a scum pipe showing a lengthwise opening disposed between and journalled by said side wall and said skirt so as to be rotatable about said generally horizontal axis approximately at the intended level of waste water in said vessel so that said scum pipe and said scum trough are generally concentric;

said scum pipe being rotatable independently of said scum trough and vice versa;

one end of said scum pipe being in fluid communication with the adjacent end of said scum pipe through said skirt;

a scum pit associated with said vessel adjacent said scum pipe;

the other end of said scum pipe being in fluid communication with said scum pit;

a pair of means, one for each of said scum pipe and scum trough, for independently and selectively rotating the associated pipe or trough about said generally horizontal axis; and a travelling structure extending between said skirt and said baffle including a depending skimming blade for engaging floatables between said skirt and said baffle and moving the same to and depositing them in said scum trough.

2. The clarifier of claim 1 wherein both said scum pipe and said scum trough are circular in cross section and have their adjacent ends open, one of said adjacent ends being disposed in the other of said adjacent ends so that material received in said scum trough may flow through said scum pipe to said scum pit.

3. The clarifier of claim 1 wherein said scum trough, on one side of the lengthwise opening therein, mounts a ramp plate adapted to be inclined upwardly to the horizontal in the direction of the opening in said scum trough such that said skimmer blade may advance floatables up said ramp into said scum trough.

4. The clarifier of claim 1 wherein the distance between said skirt and said baffle varies and said skimmer blade is made of at least two sections, one pivoted to the other about a generally vertical axis, and spring means interconnecting said sections to normally bias said sections into a planar configuration.

5. A clarifier for waste water comprising:
a vessel having a generally circular side wall;
a peripheral skirt within said vessel and spaced from but within proximity to said side wall;
means for introducing waste water into said vessel between said skirt and said side wall;
means generally centrally of said vessel defining an effluent collector;
an upstanding baffle surrounding said effluent collector and adapted to project above and below the intended level of waste water in said vessel to prevent floatables between said skirt and said baffle from moving to said effluent collector;

an elongated scum trough having a lengthwise opening in one side extending between, and journalled and supported solely by said skirt and said baffle so as to be rotatable about a generally horizontal axis approximately at the intended level of waste water in said vessel;

a scum pipe showing a lengthwise opening disposed between and journalled by said side wall and said skirt so as to be rotatable about said generally horizontal axis approximately at the intended level of waste water in said vessel so that said scum pipe and said scum trough are generally concentric;

one end of said scum pipe being in fluid communication with the adjacent end of said scum pipe through said skirt;

a scum pit associated with said vessel adjacent said scum pipe;

the other end of said scum pipe being in fluid communication with said scum pit;

means for and selectively rotating said pipe and said trough about said generally horizontal axis; and a travelling structure extending between said skirt and said baffle including a depending skimming blade for engaging floatables between said skirt and said baffle and moving the same to and depositing them in said scum trough;

said structure including an elongated support with said blade being hinged thereto in depending relation for pivotal movement about a second generally horizontal axis above said first mentioned horizontal axis; and spring means interconnecting said support and said blade and biasing said blade into waste water within said vessel.

6. The clarifier of claim 5 wherein said spring means includes a U-shaped spring straddling said hinges.

7. The clarifier of claim 5 wherein one end of said support mounts a roller, a radially outer circular track about said vessel supporting said roller, a radially inner ring above said baffle mounting the other end of said support, roller means supporting said ring for rotation centrally of said vessel, a rack mounted to said ring, and drive means, including a sprocket gear engaging said rack, for rotating said ring.

8. The clarifier of claim 7 wherein said drive means includes a motor and a control circuit therefore, a switch in said circuit for sensing a "home" position of said support, and means for selectively energizing said motor, said switch being operable to deenergize said motor when said support, after operation of said motor, has returned to said home position.

* * * * *